(12) United States Patent
Ishii

(10) Patent No.: US 6,785,426 B1
(45) Date of Patent: Aug. 31, 2004

(54) IMAGING APPARATUS, CONTROL METHOD FOR IMAGING APPARATUS, AND COMPUTER PROGRAM PRODUCT FOR PROVIDING CONTROL PROGRAM FOR IMAGING APPARATUS

(75) Inventor: Yoshiki Ishii, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 557 days.

(21) Appl. No.: 09/722,286

(22) Filed: Nov. 28, 2000

(30) Foreign Application Priority Data

Dec. 1, 1999 (JP) .......................................... 11-341959

(51) Int. Cl.$^7$ .............................. G06K 9/36; G06K 9/64
(52) U.S. Cl. ....................... 382/278; 382/284; 382/317
(58) Field of Search ................................ 382/284, 278, 382/317; 348/36, 39; 396/52, 128; 345/629

(56) References Cited

U.S. PATENT DOCUMENTS 5,416,557 A * 5/1995 Nagasaki et al. ............. 396/52
6,049,354 A * 4/2000 Sekine et al. ............. 348/208.6

FOREIGN PATENT DOCUMENTS

JP          03226075 A    * 10/1991   .......... H04N/5/225

* cited by examiner

Primary Examiner—Jon Chang
(74) Attorney, Agent, or Firm—Fitzpatrick, Cella, Harper & Scinto

(57) ABSTRACT

An imaging apparatus, a control method adaptable to the imaging apparatus, and a computer program product for providing a control program for the imaging apparatus, includes an imaging apparatus having a deflection correlation unit that corrects a deflection of an object image by displacing the object image. The deflection correction unit is actuated based on a detected correlation between a first object image and a second object image, which are picked up by an imaging unit, so that the first and second object images can be joined to form a continuous image.

24 Claims, 7 Drawing Sheets

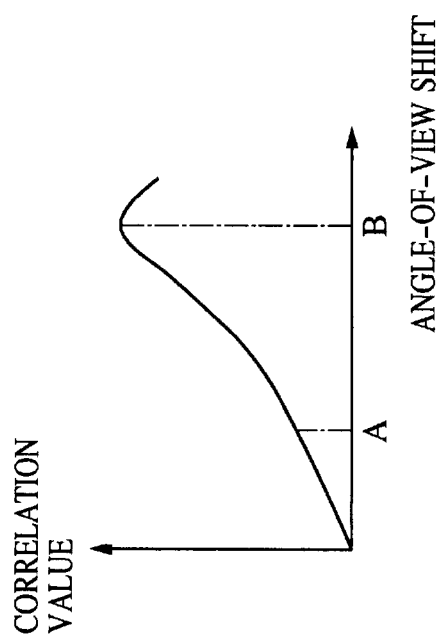
FIG. 3C
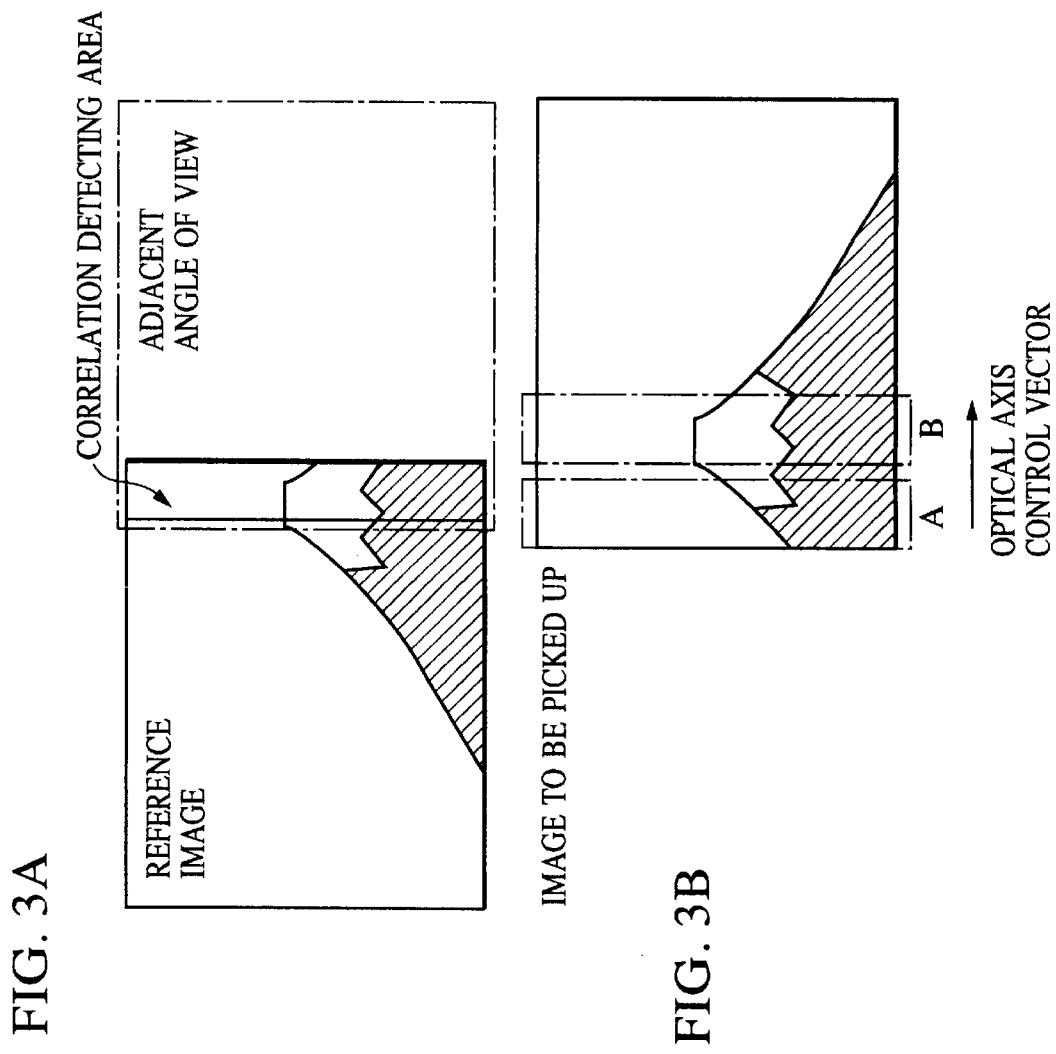
FIG. 3A
FIG. 3B

IMAGING APPARATUS, CONTROL METHOD FOR IMAGING APPARATUS, AND COMPUTER PROGRAM PRODUCT FOR PROVIDING CONTROL PROGRAM FOR IMAGING APPARATUS

BACKGROUND OF THE INVENTION

1. Field of the Invention

The present invention relates to an imaging apparatus preferably used to produce a panoramic synthetic image, a control method for the imaging apparatus, and a computer program product for providing a control program for the imaging device.

2. Description of the Related Art

Conventionally, imaging apparatuses have an optical axis displacement mechanism incorporated in an imaging means and thus exert a vibration proofing ability. Herein, the optical axis displacement mechanism can electrically or optically displace an optical center determining the center of a picked-up image. Owing to the optical axis displacement mechanism, the optical center is displaced in order to correct a hand tremble or the like.

In the imaging apparatus, a correlation value indicating a correlation between an image being picked up and an immediately preceding image is detected, and a displacement of a reference optical axis of an optical system is inferred from the detected correlation value. The optical center of the optical system is then displaced in a direction in which the inferred displacement of the reference optical axis is canceled. A hand tremble is corrected by thus displacing the optical center.

In recent years, lots of techniques have been proposed for synthesizing a plurality of images, which are defined with angles of view that are mutually adjacent angles, to produce a panoramic image, and put to practical use. One of the panoramic image synthesizing techniques is such that a plurality of picked-up images is joined while being overlapped. According to the technique, an image to be joined to one image is requested to be defined with an angle of view that is an adjacent angle of the angle of view defining the one image. If the images constituting a panoramic synthetic image are picked up using, for example, a pan head whose position can be controlled highly precisely, a high-precision panoramic image can be produced.

Assume that a plurality of images defined with angles of view that are mutually adjacent angles are picked up with the foregoing imaging apparatus having the vibration proofing ability held by the hands. In this case, first, a reference picture size is designated, and photography is carried out with reference to the reference picture size. If a hand tremble or the like occurs during photography, displacement of the optical axis of an optical system is suppressed owing to the vibration proofing ability. Consequently, deflection of an image caused by the hand tremble is suppressed.

However, the displacement of the optical axis is controlled based on the correlation value indicating the correlation between the image being picked up and the immediately preceding image. It is therefore impossible to suppress a shift of an angle of view, which defines an image and is an adjacent angle of an angle of view defining a reference image, caused by a hand tremble.

SUMMARY OF THE INVENTION

Accordingly, one aspect of the present invention to provide an imaging apparatus, a control method adaptable to the imaging apparatus, and a computer program product for providing a control program for the imaging apparatus. Herein, a deflection correction unit that corrects a deflection of an object image by displacing the object image is actuated based on a correlation between first and second object images, which are picked up by an imaging unit, in order to join the first and second object images to form a continuous image.

The deflection correction unit for correcting a vibration of an object image derived from a hand tremble or the like is used to highly precisely achieve panoramic photography, in which a plurality of joinable object images are picked up, with the imaging apparatus held by the hands.

Further aspects, features and advantages of the present invention will become apparent from the following description of the preferred embodiments with reference to the attached drawings).

BRIEF DESCRIPTION OF THE DRAWINGS

FIG. 3A to FIG. 3C show an example of a method of calculating an optical axis control vector, based on which an optical axis is displaced, using a single picture size for a photographic image picked up by the imaging apparatus shown in FIG. 1;

DESCRIPTION OF THE PREFERRED EMBODIMENTS

Preferred embodiments of the present invention will be described with reference to the drawings below.

First Embodiment

Figure 1:
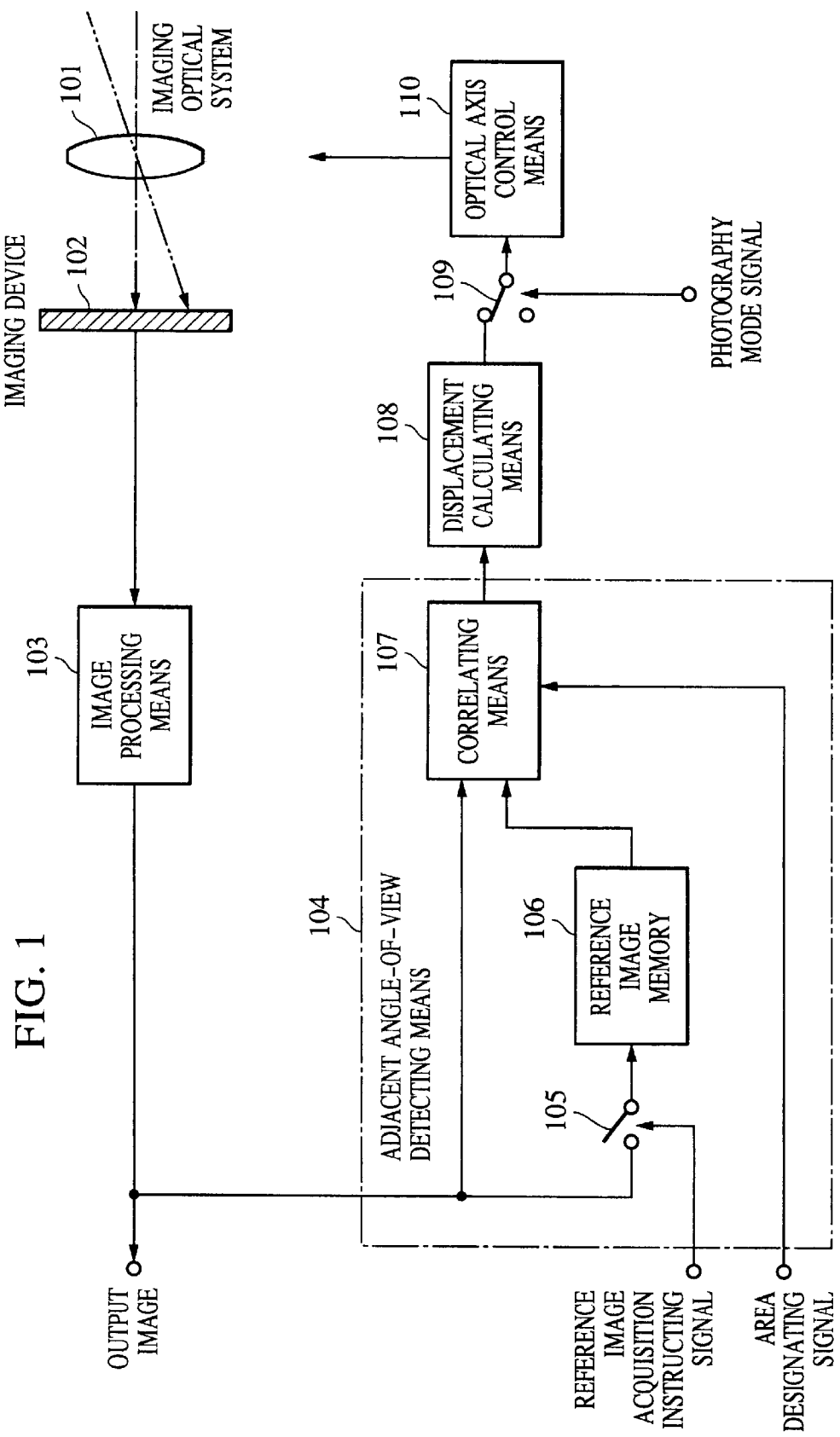
FIG. 1 is a block diagram of an imaging apparatus in accordance with the first embodiment of the present invention.

FIG. 1 is a block diagram showing an imaging apparatus in accordance with the first embodiment of the present invention.

An imaging apparatus consists mainly of, as shown in FIG. 1, an imaging optical system 101 and an imaging device 102, realized by a charge-coupled device (CCD) or the like, for converting an object image formed through the imaging optical system 101 into an electric signal. The imaging optical system 101 has a mechanism for displacing its optical axis. The displacement of the optical axis leads to displacement of an optical center determining the center of an image projected on the imaging device 102.

The imaging device 102 photoelectrically converts an object image and outputs a resultant electric signal. The electric signal is fed to image processing means 103. The image processing means 103 converts the input electric signal into digital image data (hereinafter image data). The image data is output as an output image after being subjected to predetermined image processing. The image data output from the image processing means 103 is fed to adjacent angle-of-view detecting means 104.

The adjacent angle-of-view detecting means 104 includes a switch 105 and correlating means 107. The switch 105 permits output of the input image data in response to a reference image acquisition instructing signal generated by control means. The image data output by the switch 105 is held as reference image data in reference image memory 106. The correlating means 107 calculates a correlation value indicating a correlation between a predetermined area within an image represented by the reference image data held in the reference image memory 106 and a predetermined area within an image represented by currently input image data. The predetermined area (correlation detection area) within an image is comparable to an upper, lower, leftmost, or rightmost domain within a space of a picture size, that is, a picture-size space, and is arbitrarily selected and designated based on an area designating signal generated by the control means. The correlation value is fed to displacement calculating means 108. The displacement calculating means 108 calculates a displacement of the optical axis of the imaging optical system 101 according to the input correlation value. The calculated displacement is fed to a switch 109. The switch 109 permits output of the input displacement in response to a photography mode signal. When the photography mode signal represents a panoramic synthetic photography mode, the switch 109 is turned on. When the photography mode signal represents a normal photography mode, the switch 109 is turned off. The displacement output by the switch 109 is fed to optical axis control means 110. The optical axis control means 110 outputs a control signal, which instructs displacement of the optical axis of the imaging optical system 101, to the imaging optical system 101 according to the input displacement. With the control signal, an optical center is displaced so that an image being picked up will be an image defined with an angle of view that is an adjacent angle of an angle of view defining a held reference image.

Figure 2A:
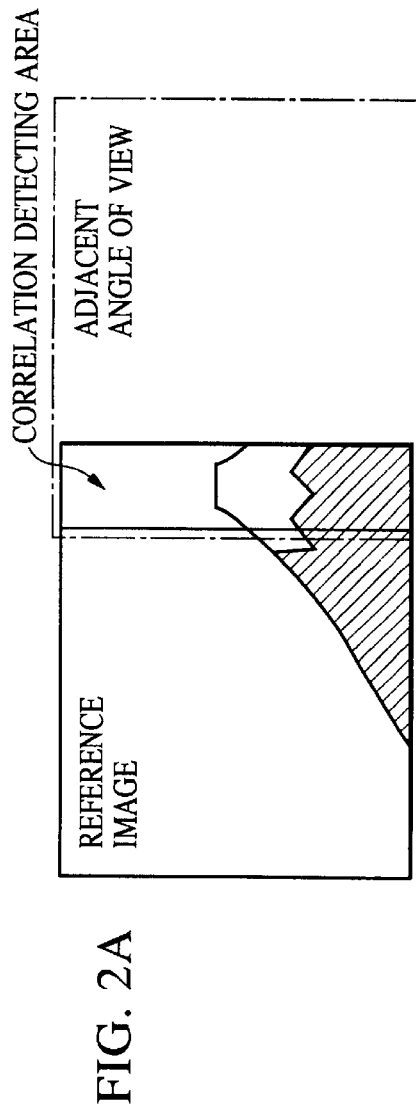
FIG. 2A to FIG. 2C are explanatory diagrams concerning the principles of detection of a correlation implemented in correlating means included in the imaging apparatus shown in FIG. 1.
Figure 2B:
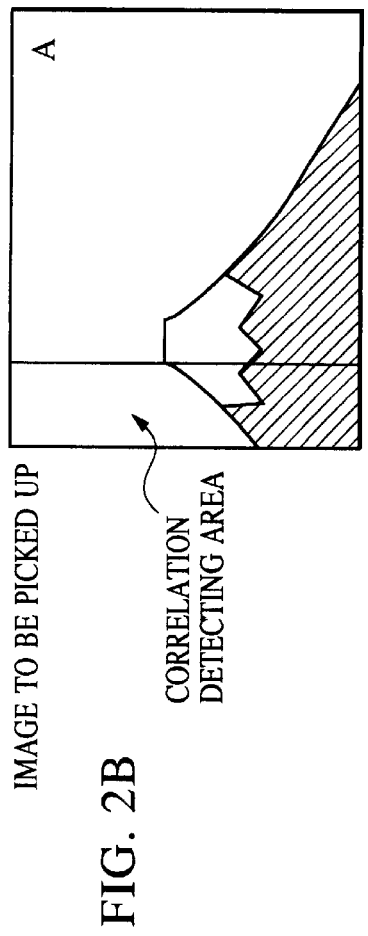
Figure 2C:
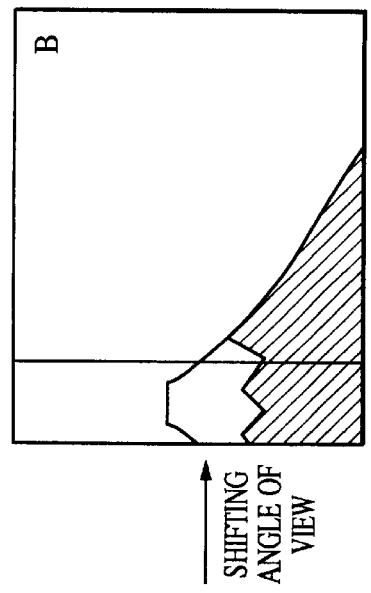
Figure 2C:
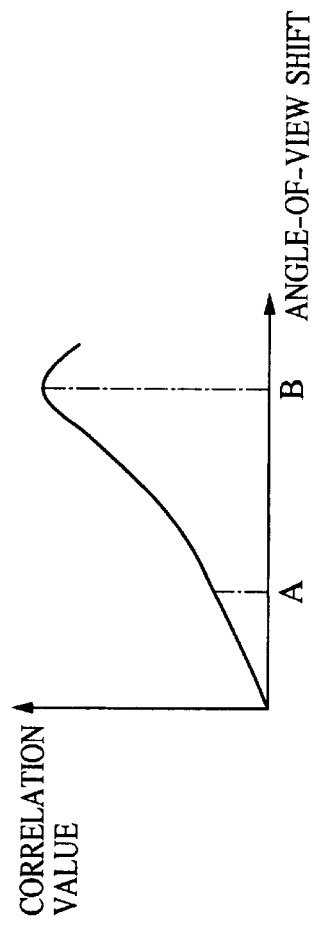

Next, a method of calculating the correlation value implemented in the correlating means 107 will be described with reference to FIG. 2A to FIG. 2C. FIG. 2A to FIG. 2C are explanatory diagrams concerning the principles of detection of a correlation implemented in the correlating means included in the imaging apparatus shown in FIG. 1.

Assuming that a space to be occupied by an image picked up and defined with an angle of view that is an adjacent angle of the angle of view defining the reference image is indicated with a dot-dash line in FIG. 2A, an area within the reference image by which the reference image overlaps the space for the image defined with the angle of view that is an adjacent angle shall be referred to as the correlation detection area.

Assuming that an image being picked up initially corresponds to an image A in FIG. 2B, in order to match the image being picked up with the image defined with the angle of view that is an adjacent angle of the angle of view of the reference image as shown in FIG. 2A, the angle of view defining the image being picked up is controlled to maximize the correlation value indicating the correlation between the correlation detection area within the image being picked up and a correlation detection area within the reference image. For maximizing the correlation value, the angle of view defining the image being picked up is shifted. Every time the angle of view is shifted, the correlation value indicating the correlation between the correlation detection area within the image being picked up and the correlation detection area within the reference value is calculated. Assuming that the angle of view defining the image being picked up is shifted to agree with an angle of view defining an image B, in this case a correlation value indicating a correlation of the image being picked up increases gradually from when the angle of view defining the image being picked up equals the angle of view defining the image A. The correlation value is maximized when the angle of view defining the image being picked up becomes equal to the angle of view defining the image B. Thereafter, the correlation value decreases gradually. By extending so-called mountain-climbing control, the optical axis of the imaging optical system can be displaced so that the angle of view defining the image being picked up will agree with the angle of view maximizing the correlation value.

Next, a method of calculating an optical axis control vector, based on which the optical axis of the imaging optical system is displaced, using a single picture size for an image to be picked up, will be described with reference to FIG. 3A to FIG. 3C. FIG. 3A to FIG. 3C explain an example of a method of calculating an optical axis control vector, based on which the optical axis of the imaging optical system is displaced, using a single picture size for an image to be picked up. This method is implemented in the imaging apparatus shown in FIG. 1.

According to the method of calculating the optical axis control vector, an area within an image being picked up, which is shown in FIG. 3B, that most greatly correlates to a correlation detection area within a reference image shown in FIG. 3A is detected. A displacement of the area from a detection area (leftmost area) in the image being picked up, which is used to detect an angle of view that is an adjacent angle and shown in FIG. 2B, is calculated. A vector based on which the optical axis is controlled is calculated based on the displacement. Consequently, the optical axis of the imaging optical system is displaced so that the angle of view defining the image being picked up will, as shown in FIG. 3C, agree with the angle of view defining the image B and maximizing the correlation value indicating the correlation between the image being picked up and the reference image.

Figure 4B:
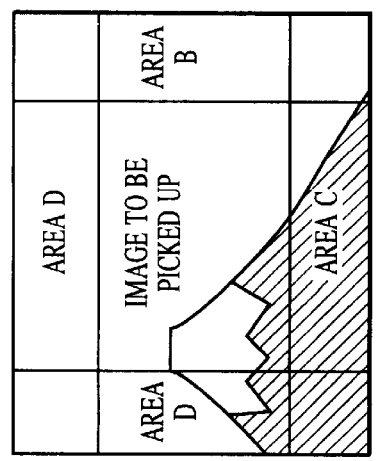
FIG. 4A and FIG. 4B show examples of spaces to be occupied by other images defined with angles of view that are adjacent angles of an angle of view defining a reference image picked up by the imaging apparatus shown in FIG. 1, and examples of correlation detection areas within the reference image.
Figure 4A:
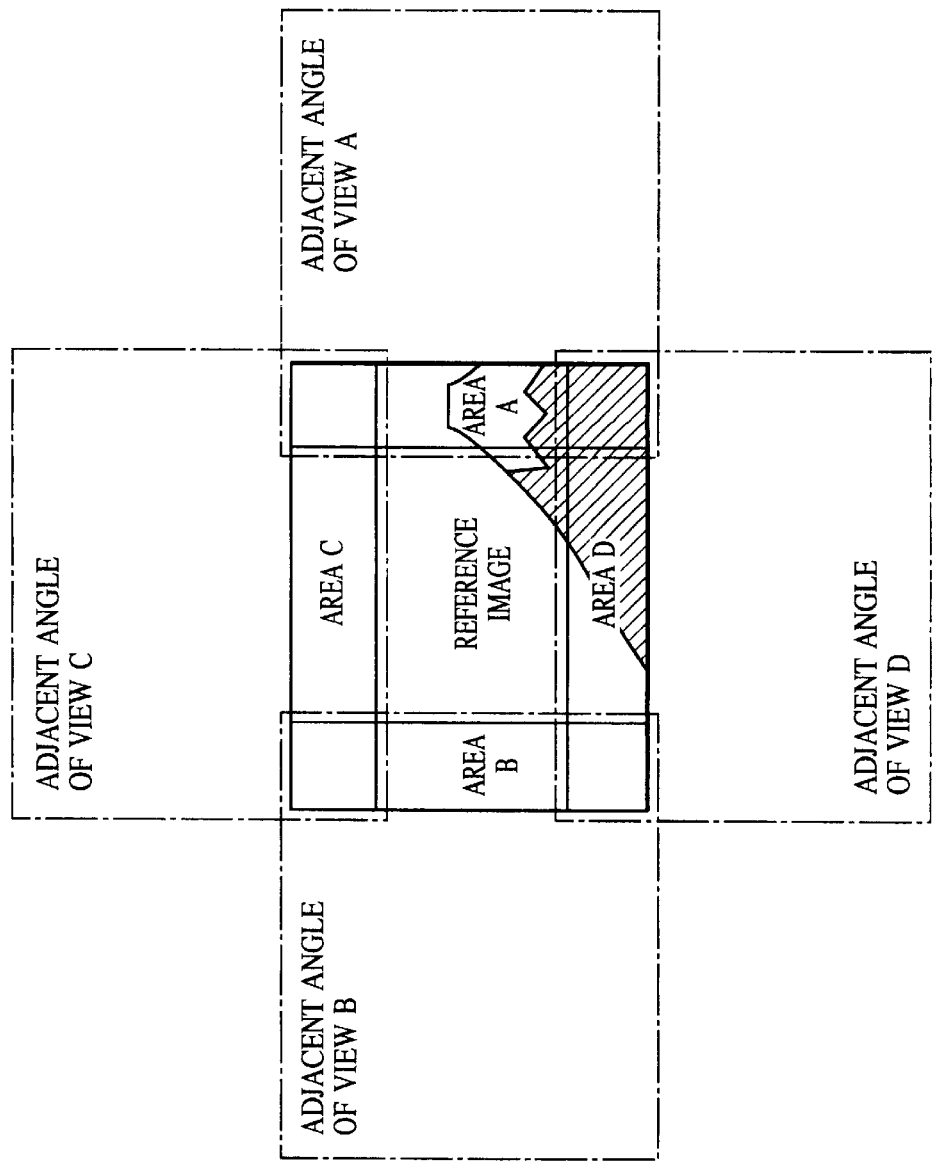

Next, examples of spaces to be occupied by other images defined with angles of view that are adjacent angles of an angle of view defining a reference image, and examples of correlation detection areas will be described with reference to FIG. 4A and FIG. 4B. FIG. 4A and FIG. 4B show examples of spaces to be occupied by other images defined with angles of view that are adjacent angles of an angle of view defining a reference image picked up by the imaging apparatus shown in FIG. 1, and examples of correlation detection areas.

For example, assuming that an image defined with an angle of view that is a vertically or laterally adjacent angle of an angle of view defining a reference image is picked up in order to produce a panoramic synthetic image, in this case, as shown in FIG. 4A and FIG. 4B, the optical axis of the imaging optical system is controlled so that an area (A, B, C, or D) within an image being picked up will most greatly correlate to an area (A, B, C, or D) within the reference image. Thus, an image defined with an angle of view that is an adjacent angle of the angle of view defining the reference image can be picked up.

As mentioned above, an optical center determining the center of an image to be picked up can be displaced electrically or optically. Owing to this ability to electrically or optically displace the optical center, a panoramic synthetic image can be produced highly precisely with the imaging apparatus held by the hands.

Second Embodiment

Figure 5:
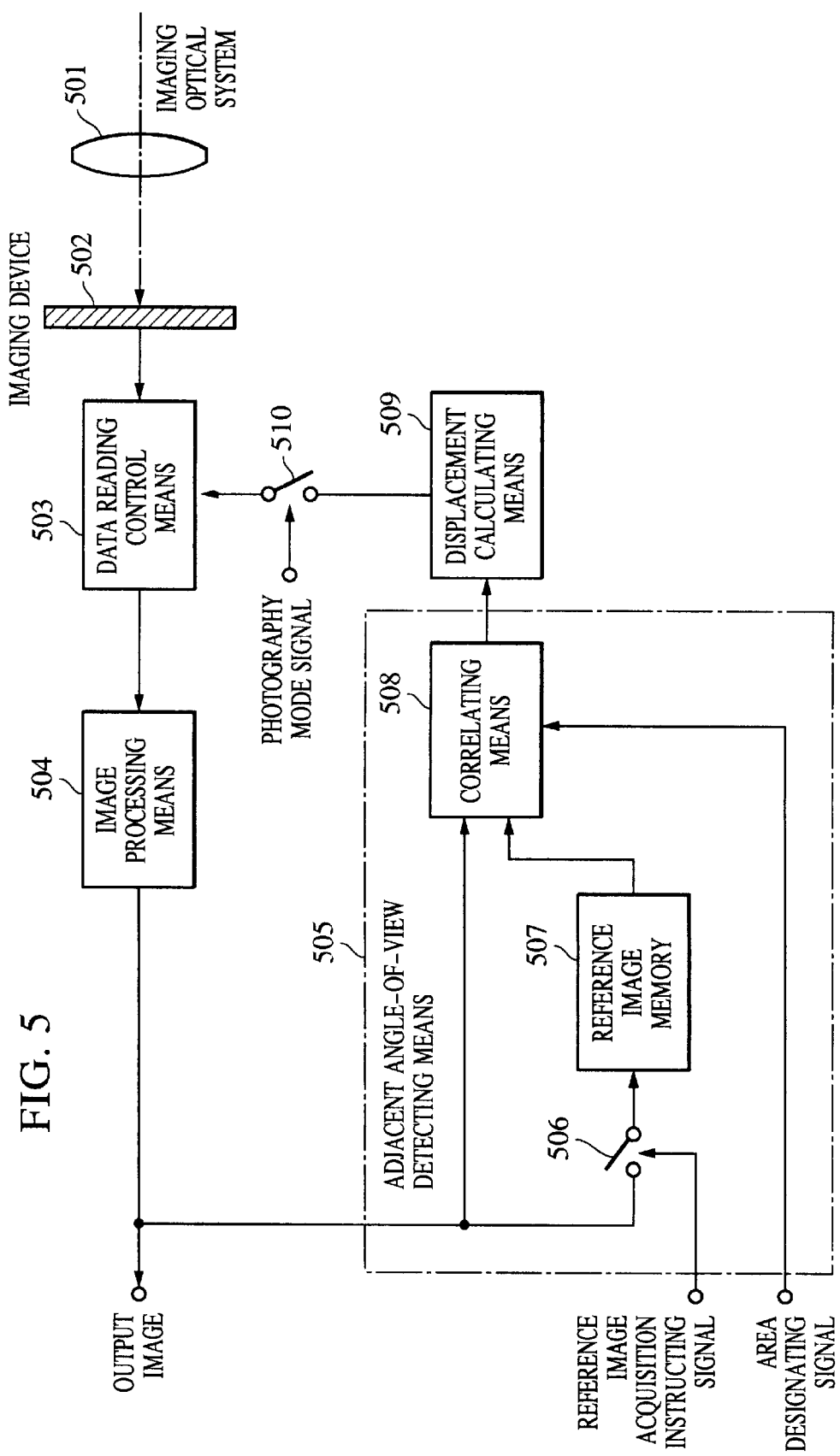
FIG. 5 is a block diagram showing an imaging apparatus in accordance with the second embodiment of the present invention.

Next, the second embodiment of the present invention will be described with reference to FIG. 5. FIG. 5 is a block diagram showing a configuration of an imaging apparatus in accordance with the second embodiment of the present invention.

The imaging apparatus consists mainly of, as shown in FIG. 5, an imaging optical system 501 and an imaging device 502, realized by a CCD or the like, for converting an object image formed through the imaging optical system 501 into an electric signal. An electric signal into which an object image is photoelectrically converted by the imaging device 502 is read by data reading control means 503. During the reading, an electric signal is read from a necessary area within the overall imaging surface of the imaging device 502. The read electric signal is fed to image processing means 504. The overall imaging surface of the imaging device 502 has an effective size larger than a required picture size. The data reading control means 503 varies the area from which an electric signal is read, whereby an image defined with an angle of view determined to deviate from an optical center can be picked up. This technique is employed in electronic proofing of vibrations. Thus, an electric signal is read from the selected area and then fed to the image processing means 504.

The image processing means 504 converts an input electric signal into digital image data (hereinafter image data). The image data is output as an output image after being subjected to predetermined image processing. Moreover, the image data output from the image processing means 504 is fed to adjacent angle-of-view detecting means 505.

The adjacent angle-of-view detecting means 505 includes a switch 506 and correlating means 508. The switch 506 permits output of input image data in response to a reference image acquisition instructing signal generated by control means. The image data output by the switch 506 is held as reference image data in reference image memory 507. The correlating means 508 calculates a correlation value indicating a correlation between a predetermined area within an image represented by the reference image data held in the reference image memory 507 and a predetermined area within an image represented by currently input image data. The predetermined area (correlation detection area) within the reference image is designated based on an area designating signal generated by the control means.

The correlation value is fed to a displacement calculating means 509. The displacement calculating means 509 calculates a displacement of the optical axis of the imaging optical system according to the input correlation value. The calculated displacement is fed to a switch 510. The switch 510 permits output of the input displacement in response to a photography mode signal. When the photography mode signal represents a panoramic synthetic photography mode, the switch 510 is turned on. When the photography mode signal represents a normal photography mode, the switch 510 is turned off. The displacement output by the switch 510 is fed to the data reading control means 503. The data reading control means 503 displaces an optical center, which determines the center of an image to be picked up, according to the input displacement. The data reading control means 503 then reads an electric signal from an area of the imaging device on which the image whose center coincident with the displaced optical center is projected.

Thus, an image being picked up is matched with an image defined with an angle of view that is an adjacent angle of an angle of view defining a held reference image. In other words, an image defined with an angle of view that is an adjacent angle of an angle of view defining a reference image can be picked up.

Third Embodiment

Figure 6:
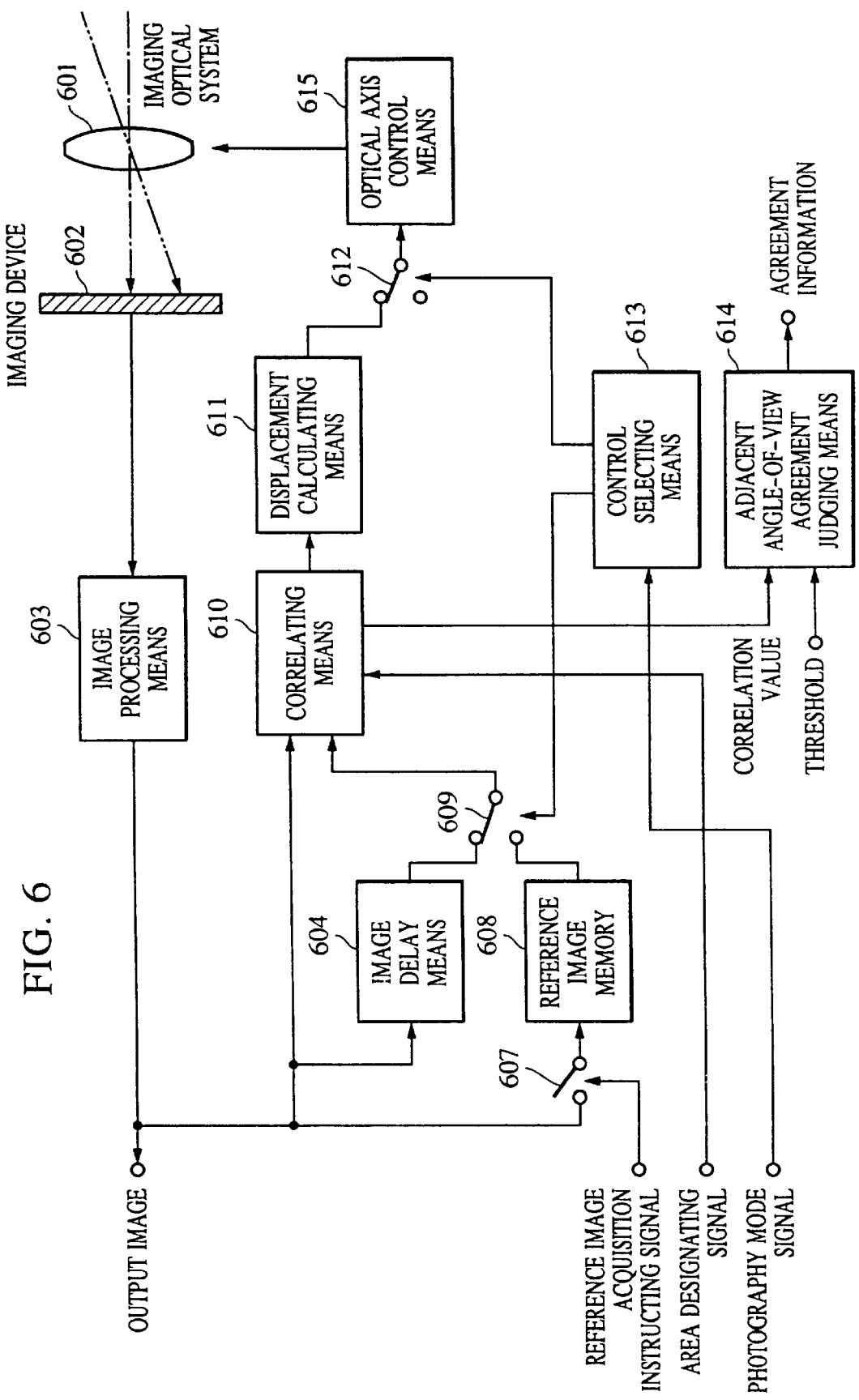
FIG. 6 is a block diagram showing an imaging apparatus in accordance with the third embodiment of the present invention.

Next, the third embodiment of the present invention will be described with reference to FIG. 6. FIG. 6 is a block diagram showing a configuration of an imaging apparatus in accordance with the third embodiment of the present invention.

The imaging apparatus consists mainly of, as shown in FIG. 6, an imaging optical system 601 and an imaging device 602, realized by a CCD or the like, for converting an object image formed through the imaging optical system 601 into an electric signal. The imaging optical system 601 includes a mechanism for displacing the optical axis thereof. The displacement of the optical axis leads to displacement of an optical center determining the center of an image projected on the imaging device 602.

The imaging device 602 photoelectrically converts an object image and outputs an electric signal. The electric signal is fed to image processing means 603. The image processing means converts the input electric signal into digital image data (hereinafter image data). The image data is output as an output image after being subjected to predetermined image processing. Moreover, the image data output from the image processing means 603 is fed to a switch 607, image delay means 604, and correlating means 610, respectively.

The switch 607 permits output of the input image data in response to a reference image acquisition instructing signal generated by control means. The image data output by the switch 607 is held as reference image data in a reference image memory 608. The image delay means 604 delays the input image data by a time lag corresponding to, for example, one frame. The delayed image data is fed to a switch 609. The switch 609 selects one of the image data sent from the image delay means 604 and the reference image data read from the reference image memory 608, in accordance with a selection control signal output from control selecting means 613, to be described later.

The correlating means 610 calculates a correlation value indicating a correlation between image data output by the switch 609 (image data sent from the image delay means 604 or reference image data read from the reference image memory 608) and currently input image data. A method of calculating the correlation value differs in accordance with the photography mode, as will be detailed later.

The calculated correlation value is fed to displacement calculating means 611 and adjacent angle-of-view agreement judging means 614, respectively. The displacement calculating means 611 calculates a displacement of the optical axis of the imaging optical system 601 according to the input correlation value. The calculated displacement is fed to a switch 612. The switch 612 is turned on or off in accordance with a selection control signal sent from the control selecting means 613, to be described later. The displacement output by the switch 612 is fed to an optical axis control means 615. The optical axis control means 615 outputs a control signal, which instructs displacement of the optical axis of the imaging optical system 601, to the imaging optical system 601, in accordance with the input displacement.

The control selecting means 613 inputs a photography mode signal, and outputs a selection control signal to the switch 609 or switch 612, in accordance with the photography mode signal. Moreover, the adjacent angle-of-view agreement judging means 614 compares an input correlation value with an input threshold value. If the correlation value is equal to or larger than the threshold value, agreement information is output.

Next, actions to be performed in photography modes in the imaging apparatus will be described below.

The photography modes include a vibration-proof photography mode and a panoramic synthetic photography mode. In the vibration-proof photography mode, the control selecting means 613 outputs a selection control signal, which instructs selection and output of image data sent from the image delay means 604, to the switch 609, in response to a photography mode signal representing the vibration-proof photography mode. Moreover, the control selecting means 613 outputs the selection control signal, which now instructs output of a displacement sent from the displacement calculating means 611, to the switch 612.

Consequently, image data representing an image being picked up and image data sent from the image delay means 604 (data immediately preceding the current image data) are fed to the correlating means 610. The correlating means 610 then calculates a correlation value indicating a correlation between the image data representing the image being picked up and the image data sent from the image delay means 604. The correlation value is fed to the displacement calculating means 611. The displacement calculating means 611 calculates a displacement of the optical axis as a value maximizing the correlation value. The calculated displacement is fed to the optical axis control means 615 via the switch 612. The optical axis control means 615 outputs a control signal, which instructs displacement of the optical axis of the imaging optical system 601, to the imaging optical system 601, in accordance with the input displacement. Thus, control is extended to cancel the displacement of the optical axis. Consequently, a deflection of an image caused by hand tremble or the like is corrected.

In the panoramic synthetic photography mode, the control selecting means 613 outputs a selection control signal, which instructs selection and output of reference image data read from the reference image memory 608, to the switch 609, in response to a photography mode signal representing the panoramic synthetic photography mode. Moreover, the control selecting means 613 outputs the selection control signal, which now instructs output of a displacement sent from the displacement calculating means 611, to the switch 612.

Consequently, the correlating means 610 inputs image data representing an image being picked up and reference image data read from the reference image memory 608. The correlating means 610 calculates a correlation value indicating a correlation between a predetermined area within an image represented by the reference image data and a predetermined area within an image represented by the currently input image data. The predetermined area within an image (correlation detection area) is defined based on an area designating signal generated by the control means. The correlation value is fed to the displacement calculating means 611. The displacement calculating means 611 calculates a displacement of the optical axis of the imaging optical system 601, in accordance with the input correlation value. The calculated displacement is fed to the optical axis control means 615 via the switch 612. The optical axis control means 615 outputs a control signal, which instructs displacement of the optical axis of the imaging optical system 601, to the imaging optical system 601, in accordance with the input displacement. Consequently, the image being picked up is matched with an image defined with an angle of view that is an adjacent angle of an angle of view defining the reference image. In other words, an image defined with an angle of view that is an adjacent angle of an angle of view-defining the reference image can be picked up with high precision with the imaging apparatus being hand-held.

Moreover, the correlation value calculated by the correlating means 610 is fed to the adjacent angle-of-view agreement judging means 614. The adjacent angle-of-view agreement judging means 614 compares the input correlation value with a threshold value. If the correlation value is equal to or larger than the threshold value (for example, a value at point B in FIG. 2C), agreement information indicating this fact is output. With the agreement information, a photographer is informed of the fact that the image being picked up is produced as an image defined with an angle of view that is an adjacent angle of an angle of view defining the held reference image.

Fourth Embodiment

Figure 7:
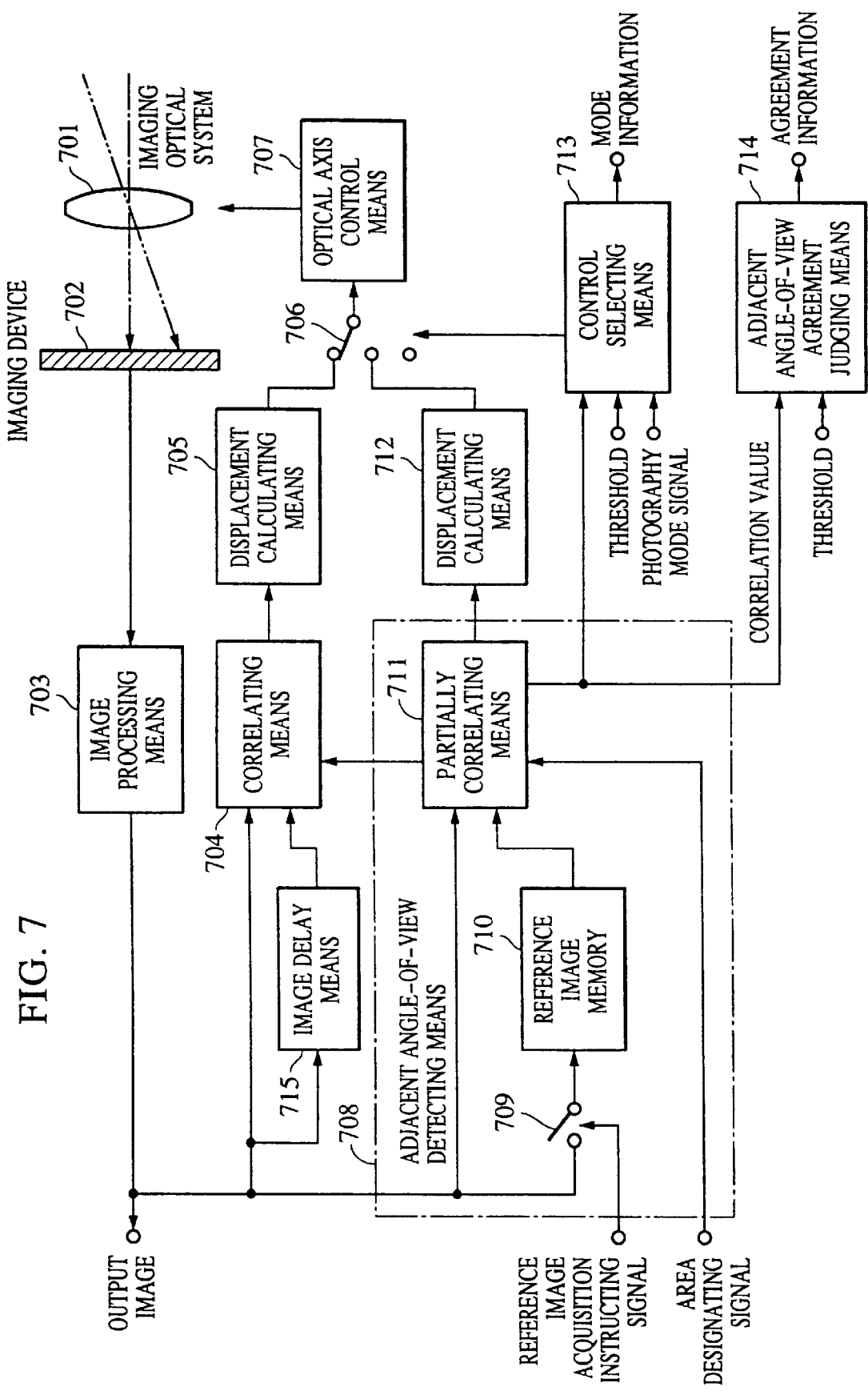
FIG. 7 is a block diagram showing an imaging apparatus in accordance with the fourth embodiment of the present invention.

Next, the fourth embodiment of the present invention will be described with reference to FIG. 7. FIG. 7 is a block diagram showing a configuration of an imaging apparatus in accordance with the fourth embodiment of the present invention.

The imaging apparatus consists mainly of, as shown in FIG. 7, an imaging optical system 701 and an imaging device 702 for converting an object image formed through the imaging optical system 701 into an electric signal. The imaging optical system 701 has a mechanism for displacing the optical axis thereof. The displacement of the optical axis leads to displacement of an optical center determining the center of an image projected on the imaging device 702.

The imaging device 702 photoelectrically converts an object image and outputs an electric signal. The electric signal is fed to image processing means 703. The image processing means 703 converts the input electric signal into digital image data (hereinafter image data). The image data is output as an output image after being subjected to predetermined image processing. Moreover, the image data output from the image processing means 703 is fed to image delay means 715, correlating means 704, and adjacent angle-of-view detecting means 708, respectively.

The image delay means 715 delays input image data by a time lag corresponding to, for example, one frame. The delayed image data is fed to the correlating means 704. The correlating means 704 calculates a correlation value indicating a correlation between currently input image data and image data sent from the image delay means 715. The correlation value is fed to displacement calculating means 705. The displacement calculating means 705 calculates a displacement of the optical axis of the imaging optical system as a value maximizing the correlation value. The calculated displacement is fed to optical axis control means 707 when selected by a switch 706, in response to a selection control signal generated by control selecting means 713, to be described later.

The adjacent angle-of-view detecting means 708 includes a switch 709 and partial correlating means 711. The switch 709 permits output of input image data in response to a reference image acquisition instructing signal generated by control means. The image data output by the switch 709 is held as reference image data in a reference image memory 710. The partial correlating means 711 calculates a correlation value indicating a correlation between a predetermined area within an image represented by the reference image data held in the reference image memory 710 and a predetermined area within an image represented by currently input image data. The predetermined area within an image (correlation detection area) is defined based on an area designating signal generated by the control means. The correlation value is fed to displacement calculating means 712. The displacement calculating means 712 calculates a displacement of the optical axis of the imaging optical system 701, in accordance with the input correlation value. The calculated displacement is fed to the optical axis control means 707, when selected by the switch 706, in response to a selection control signal generated by the control selecting means 713, to be described later. The optical axis control means 707 outputs a control signal, which instructs displacement of the optical axis of the imaging optical system 701, to the imaging optical system 701, in accordance with the input displacement.

The correlation value calculated by the partial correlating means 711 is fed to the control selecting means 713 and adjacent angle-of-view agreement judging means 714, respectively. The control selecting means 713 inputs a photography mode signal and a threshold value together with the correlation value, and outputs a selection control signal to the switch 706, in accordance with these inputs. Specifically, when the vibration-proof photography mode is designated, the selection control signal to be fed to the switch 706 instructs output of the displacement sent from the displacement calculating means 705. When the panoramic synthetic photography mode is designated, the input correlation value is compared with the input threshold value. If the correlation value is smaller than the threshold value, the selection control signal to be fed to the switch 706 instructs output of the displacement sent from the displacement calculating means 705. If the correlation value is equal to or larger than the threshold, the selection control signal to be fed to the switch 706 instructs output of the displacement sent from the displacement calculating means 712.

The adjacent angle-of-view agreement judging means 714 compares the correlation value with the threshold value. If the correlation value is equal to or larger than the threshold value, agreement information is output.

Next, actions to be performed in the photography modes in the imaging apparatus will be described below.

When the vibration-proof photography mode is designated, the control selecting means 713 outputs a selection control signal, which instructs output of the displacement sent from the displacement calculating means 705, to the switch 706, in response to a photography mode signal representing the vibration-proof photography mode. The correlating means 704 inputs image data being picked up and image data sent from the image delay means 715 (data immediately preceding the current image data). A correlation value indicating a correlation between the image data being picked up and the image data sent from the image delay means 715 is calculated, and fed to the displacement calculating means 705. The displacement calculating means 705 calculates a displacement of the optical axis of the imaging optical system as a value maximizing the correlation value. The calculated displacement is fed to the optical axis control means 707 via the switch 706. The optical axis control means 707 outputs a control signal, which instructs displacement of the optical axis of the imaging optical system 701, to the imaging optical system 701, in accordance with the input displacement. Consequently, control is extended to cancel the displacement of the optical axis. In this manner, deflection of an image caused by hand tremble or the like is corrected.

When the panoramic synthetic photography mode is designated, the partial correlating means 711 inputs image data being picked up and reference image data read from the reference image memory 710. The partial correlating means 711 then calculates a correlation value indicating a correlation between a predetermined area within an image represented by the reference image data and a predetermined area within an image represented by the currently input image data. The predetermined area within an image (correlation detection area) is defined based in an area designating signal generated by the control means. The correlation value is fed to the displacement calculating means 712, control selecting means 713, and adjacent angle-of-view agreement judging means 714, respectively. The displacement calculating means 712 calculates a displacement of the optical axis of the imaging optical system 701, in accordance with the input correlation value.

When determining from a photography mode signal that the panoramic synthetic photography mode has been designated, the control selecting means 713 compares the correction value sent from the partial correlating means 711 with an input threshold value. If the correlation value is smaller than the threshold value, a selection control signal instructing output of the displacement sent from the displacement calculating means 705 is fed to the switch 706. If the correlation value is equal to or larger than the threshold value, the selection control signal now instructing output of the displacement sent from the displacement calculating means 712 is fed to the switch 706. When the correlation value is smaller than the threshold value, it means that the imaging apparatus has not been brought to a state in which a panoramic synthetic image can be produced. The displacement sent from the displacement calculating means 705 is therefore fed to the optical axis control means 707 via the switch 706. Regardless, hand tremble is corrected. If the correlation value is equal to or larger than the threshold value, it means that the imaging apparatus has been brought to the state in which a panoramic synthetic image can be produced. In this case, the displacement sent from the displacement calculating means 712 is fed to the optical axis control means via the switch 706. The optical axis of the imaging optical system is displaced so that the image being picked up will be matched with an image defined with an angle of view that is an adjacent angle of an angle of view defining the held reference image. Information indicating whether a hand tremble is corrected because the correction value is smaller than the threshold value, or the optical axis of the imaging optical system is displaced so that the image being picked up will be matched with an image defined with an angle of view that is an adjacent angle of an angle of view defining the held reference image, is output as mode information. With this mode information, a user is informed whether control is extended to correct a hand tremble or to displace the optical axis.

The adjacent angle-of-view agreement judging means 714 compares an input correction value with an input threshold value. If the correction value is equal to or larger than the threshold value (a value at point B in FIG. 2C), agreement information indicating that fact is output. With this agreement information, a photographer is informed of the fact that the image being picked up is produced as an image defined with an angle of view that is an adjacent angle of the angle of view defining the held reference image.

The individual components shown in schematic or block form in the drawings are all well-known in the camera arts, and their specific construction and operation are not critical to the operation or best mode for carrying out the invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, the present invention can be implemented not only in apparatuses for performing panoramic photography, but also in apparatuses for performing automatic sequential photography or exploiting other relevant photographic technologies.

Moreover, in the aforesaid embodiments, when the imaging apparatus is operated in the panoramic synthetic photography mode, vibration proofing is not actuated. Alternatively, vibration proofing may be actuated even in the panoramic synthetic photography mode.

Moreover, the aforesaid embodiments may be implemented by software or hardware.

The present invention encompasses the aforesaid embodiments as well as combinations of required ones of technological elements employed in the embodiments.

According to the present invention, the whole or part of a configuration described in any of the claims or described as any of the embodiments may be realized as a stand-alone apparatus, may be combined with any other apparatus, or may be included as a component in a system.

Moreover, the present invention can be adapted to a video camera for producing a motion picture or still images, a camera using a silver film, a silver-lens reflex camera, a leaf shutter camera, and various other types of cameras. Moreover, the present invention can be adapted to imaging apparatuses other than cameras, such as an image reading apparatus, an optical apparatus, and other apparatuses. Furthermore, the present invention can be adapted to devices to be employed in such cameras, imaging apparatuses, image reading apparatus, optical apparatus, and other apparatuses. The present invention also can be adapted to components of such devices, control methods adapted for such devices, and computer program products for releasing control programs.

What is claimed is:

1. An apparatus comprising:
   an imaging unit that picks up an object image;
   a deflection correction unit that corrects a deflection of the object image by displacing the object image; and
   a control unit that actuates said deflection correction unit according to a correlation between a first object image and a second object image, which are picked up by said imaging unit, so that the first and second object images are joined to form a continuous images,
   wherein said control unit actuates said deflection correction unit on the basis of detection of a relationship leading to the greatest correlation between the first object image and the second object image, and
   wherein said control unit actuates said deflection correction unit so that part of the first object image defined in a first area within an image pick-up field of said imaging unit will most greatly correlate to part of the second object image defined in a second area, which is located on the opposite side of the first area, within the image pick-up field of said imaging unit.

2. An apparatus according to claim 1, wherein said deflection correction unit optically corrects a deflection of an object image.

3. An apparatus according to claim 1, wherein said deflection correction unit corrects a deflection of an object image through electric image processing.

4. An apparatus according to claim 1, wherein the second area is axially symmetric to the first area within the image pick-up field.

5. An apparatus according to claim 1, wherein the first and second areas are located on edges of the image pick-up field.

6. An apparatus according to claim 1, wherein said control unit can designate a position of the first area within the image pick-up field.

7. An apparatus according to claim 1, wherein said control unit can change a position of the first area within the image pick-up field.

8. An apparatus according to claim 1, wherein said control unit detects a second area within an image pick-up field of said imaging unit, in which part of the second object image most greatly correlating to part of the first object image defined in a first area within the image pick-up field of said imaging unit, and said control unit actuates said deflection correction unit according to a result of detecting the second area so that the second area will be located on the opposite side of the image pick-up field relative to the first area.

9. An apparatus according to claim 8, wherein the second area is axially symmetric to the first area within the image pick-up field.

10. An apparatus according to claim 8, wherein the first and second areas are located on edges of the image pick-up field.

11. An apparatus according to claim 8, wherein said control unit can designate a position of the first area within the image pick-up field.

12. An apparatus according to claim 8, wherein said control unit can change a position of the first area within the image pick-up field.

13. An apparatus according to claim 8, wherein said control unit judges whether the greatest correlation between the first and second areas falls within a predetermined range.

14. An apparatus according to claim 8, wherein said control unit reports whether the greatest correlation between the first and second areas falls within a predetermined range.

15. An apparatus according to claim 1, wherein said control unit switches between at least a first operation mode, in which said control unit detects a vibration state and actuates said deflection correction unit based on the vibration state, and a second operation mode, in which said control unit actuates said deflection correction unit based on the correlation between the first object image and the second object image so that the first and second object images are joined to form a continuous image.

16. An apparatus comprising:
   an imaging unit that picks up an object image;
   a deflection correction unit that corrects a deflection of the object image by displacing the object image; and
   a control unit that actuates said deflection correction unit according to a correlation between a first object image and a second object image, which are picked up by said imaging unit, so that the first and second object images are joined to form a continuous image, wherein said control unit switches between at least a first operation mode, in which said control unit detects a vibration state and actuates said deflection correction unit based on the vibration state, and a second operation mode, in which said control unit actuates said deflection correction unit based on the correlation between the first object image and the second object image so that the first and second object images are joined to form a continuous image, and wherein said control unit automatically switches between the first operation mode and the second operation mode according to the correlation between the first object image and the second object image.

17. An apparatus comprising:

an imaging unit that picks up an object image;

a deflection correction unit that corrects a deflection of the object image by displacing the object image; and a control unit that actuates said deflection correction unit according to a correlation between a first object image and a second object image, which are picked up by said imaging unit, so that the first and second object images are be joined to form a continuous image, wherein said control unit switches between at least a first operation mode, in which said control unit detects a vibration state and actuates said deflection correction unit based on the vibration state, and a second operation mode, in which said control unit actuates said deflection correction unit based on the correlation between the first object image and the second object image so that the first and second object images are joined to form a continuous image, and wherein said control unit automatically selects the first operation mode when the correlation between the first object image and the second object image is lower than a predetermined level, and selects the second operation mode when the correlation between them is higher than the predetermined level.

18. An apparatus according to claim 1, wherein said apparatus includes an imaging apparatus.

19. An apparatus according to claim 1, wherein said apparatus includes a camera.

20. An apparatus according to claim 1, wherein said apparatus includes a video camera.

21. A control method adaptable to an imaging apparatus, comprises:

a deflection correction step of correcting a deflection of an object image by displacing the object image, actuated based on a correlation between a first object image and a second object image picked up by an imaging unit, so that the first and second object images are joined to form a continuous image, actuating said deflection correction step on the basis of detection of a relationship leading to the greatest correlation between the first object image and the second object image, and controlling actuation of said deflection correction step so that part of the first object image defined in a first area within an image pick-up field of the imaging unit will most greatly correlate to part of the second object image defined in a second area, which is located on the opposite side of the first area, within the image pick-up field of the imaging unit.

22. A computer program product comprising a computer readable medium storing a control program adaptable to an imaging apparatus, said control program performing the steps of:

a deflection correction step of correcting a deflection of an object image by displacing the object image, actuated based on a correlation between a first object image and a second object image picked up by an imaging unit, so that the first and second object images are joined to form a continuous images, actuating said deflection correction step on the basis of detection of a relationship leading to the greatest correlation between the first object image and the second object image, and controlling actuation of said deflection correction step so that part of the first object image defined in a first area within an image pick-up field of the imaging unit will most greatly correlate to part of the second object image defined in a second area, which is located on the opposite side of the first area, within the image pick-up field of the imaging unit.

23. A method comprising:

an imaging step of picking up an object image;

a deflection correction step of correcting a deflection of the object image by displacing the object image; and controlling said correction step according to a correlation between a first object image and a second object image, which are picked up in said imaging step, so that the first and second object images will be joined to form a continuous image, wherein said control step switches at least a first operation mode, in which said control step detects a vibration state and actuates deflection correction based on the vibration state, and a second operation mode in which said control step actuates the deflection correction based on the correlation between the first object image and second object image so that the first and second object images will be joined to form a continuous image, and wherein said control step automatically switches the first operation mode and second operation mode according to the correlation between the first object image and second object image.

24. A method comprising:

an imaging step of picking up an object image;

a deflection correction step of correcting a deflection of the object image by displacing the object image; and a control step of controlling the deflection correction step according to a correlation between a first object image and a second object image, which are picked up in said imaging step, so that the first and second object images will be joined to form a continuous image, wherein said control step switches at least a first operation mode, in which said control step detects a vibration state and actuates deflection correction based on the vibration state, and a second operation mode in which said control step actuates the deflection correction based on the correlation between the first object image and second object image so that the first and second object images will be joined to form a continuous image, and wherein said control step automatically selects the first operation mode when the correlation between the first object image and second object image is lower than a predetermined level, and selects the second operation mode when the correlation between them is higher than the predetermined level.

* * * * *

UNITED STATES PATENT AND TRADEMARK OFFICE
CERTIFICATE OF CORRECTION

PATENT NO. : 6,785,426 B1
DATED : August 31, 2004
INVENTOR(S) : Yoshiki Ishii

It is certified that error appears in the above-identified patent and that said Letters Patent is hereby corrected as shown below:

<u>Title page,</u>
Item [57], ABSTRACT,
Line 4, "includes" should read -- include --.

<u>Column 11,</u>
Line 63, "images,"should read -- image, --.

<u>Column 13,</u>
Line 23, "are be" should read -- are --.

<u>Column 14,</u>
Line 6, "images," should read -- image, --.

Signed and Sealed this

Eighteenth Day of January, 2005

JON W. DUDAS
*Director of the United States Patent and Trademark Office*